(No Model.) 10 Sheets—Sheet 2.

J. R. WILLIAMS.
MACHINE FOR CUTTING WRAPPERS AND BINDERS FOR CIGARS.

No. 589,884. Patented Sept. 14, 1897.

Fig. 2.

WITNESSES:
William P. Goebel.
E. Jos. Belknap.

INVENTOR
John R. Williams,
BY
Chas. C. Gill
ATTORNEY

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

MACHINE FOR CUTTING WRAPPERS AND BINDERS FOR CIGARS.

SPECIFICATION forming part of Letters Patent No. 589,884, dated September 14, 1897.

Application filed June 2, 1897. Serial No. 639,112. (No model.)

*To all whom it may concern:*

Be it known that I, JOHN R. WILLIAMS, a citizen of the United States, and a resident of East Orange, in the county of Essex and State of New Jersey, have invented certain new and useful Improvements in Machines for Cutting Wrappers for Cigars, Cigarettes, and the Like, of which the following is a specification.

The invention relates to improvements in machines for cutting wrappers and binders for cigars, cigarettes, and the like; and it consists in the novel features of construction and combinations and organizations of parts hereinafter described, and particularly pointed out in the claims.

In this application and as presenting the preferred embodiment of the invention I describe and illustrate a machine for cutting wrappers for cigars, and said machine above its table or bed-plate comprises, first, a wrapper-cutting die connected with air-suction and adapted to travel from the point at which it receives the leaf to the point at which the cut wrapper is removed therefrom; second, means in the path of said die for pressing the leaf thereon during the travel of said die for effecting the cutting of the wrapper, and, third, means connected with air-suction for removing the cut wrapper from the die at the end of each movement of the latter to its point of delivery and depositing the wrappers upon one another to form a book. Below the table or bed-plate of the said machine is suitably arranged the mechanism for actuating said die and controlling the air-suction therefor, for controlling the vertical reciprocating movement of the rollers which press the leaf upon the die during the travel of the latter, and for controlling the movement and suction of the nozzle which removes the cut wrappers from the die and deposits them upon one another to form the book.

The nature, construction, and operation of the aforesaid cigar-wrapper-cutting machine is fully described hereinafter, and said machine is illustrated in the accompanying drawings, in which—

Fig. 16 is a longitudinal section through a portion of the frame of the machine and partly broken away and illustrating, on an enlarged scale and in side elevation, the mechanism by which the cutting-die and its carrying-arm are given an oscillating movement from the position in which said parts are shown in Fig. 1 to that in which they are illustrated by dotted lines in Fig. 2. Fig. 17 is a detached vertical section through a portion of the machine on the dotted line 17 17 of Fig. 16. Fig. 18 is a detached top view of the air-box containing the valves by which the suction on the cutting-die and nozzle is respectively controlled.

In the drawings, 30 denotes the table or bed-plate of the machine, said table being suitably supported upon legs or frames 31 of any desirable character. Above the bed-plate 30 are located the three main elements of the machine, the first being the cutting-die 32, connected with air-suction and carried by the oscillating arm 33, the second being the pressure-rollers 34, carried at the lower end of the plunger-rod 35, which is held in the front end of the frame 36 and is operated by means of a substantially centrally-pivoted lever 37, and the third element being the nozzle 38, also connected with air-suction and supported in the front end of the hollow frame 39.

The cutting-die is adapted to have a movement from its initial or normal position shown in Fig. 1, to the position in which it is indicated by the dotted lines in Fig. 2, the die receiving this movement by the mechanism hereinafter described by which the arm 33, carrying said die, is oscillated. The pressure-rollers 34 are held stationary by the frame 36 so far as any lateral action is concerned, but are adapted to have a vertical reciprocating movement imparted to them from the lever 37 and the mechanism hereinafter described for actuating said lever. The rollers 34 are in the path of the die 32 and descend when the die 32 starts to the left in order that as the die passes below them they may press the leaf thereon and thereby effect the cutting of the wrapper therefrom. After the die 32 passes to the left beyond the rollers 34 the latter are given their upward movement, so as not to interfere with the die upon its return to its normal position.

Figure 13:
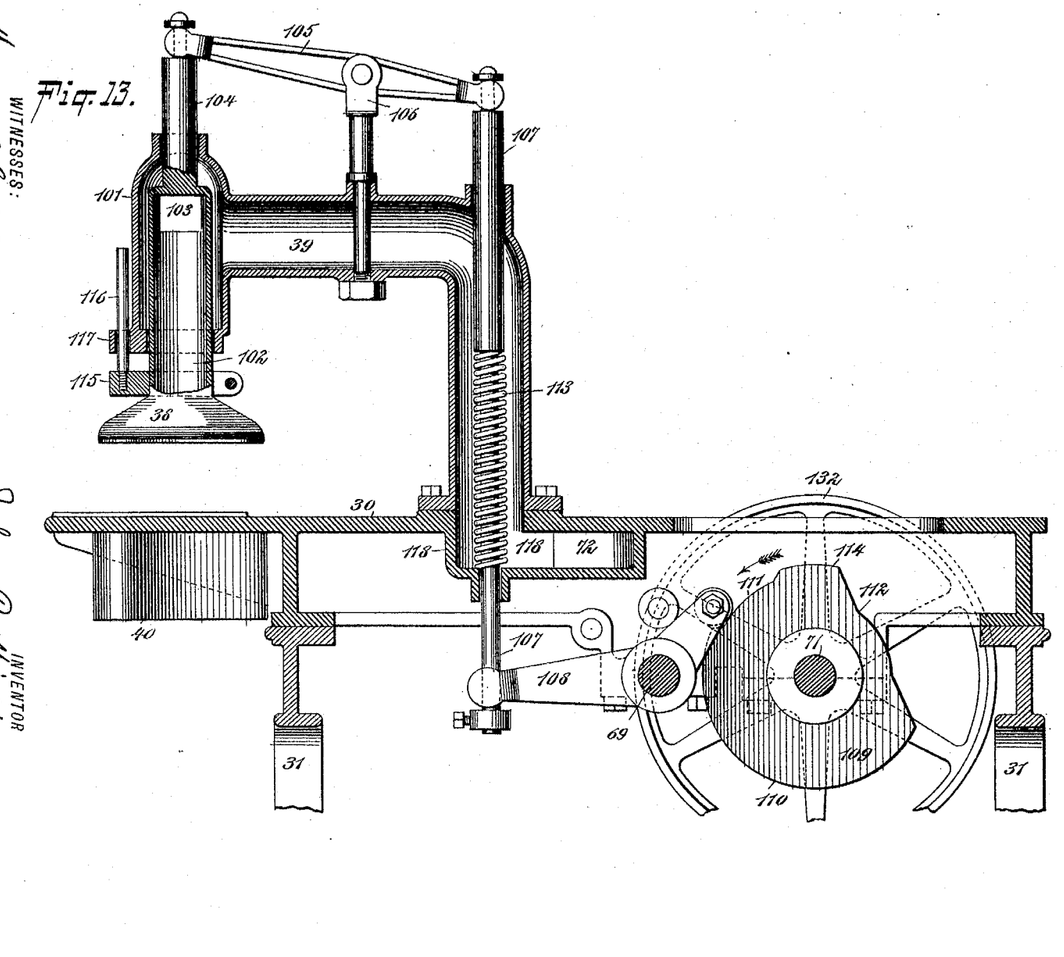
Fig. 13 is a vertical longitudinal section through the machine on the dotted line 13 13 of Fig. 1 and showing the nozzle in its elevated position.
Figures 14, 15:
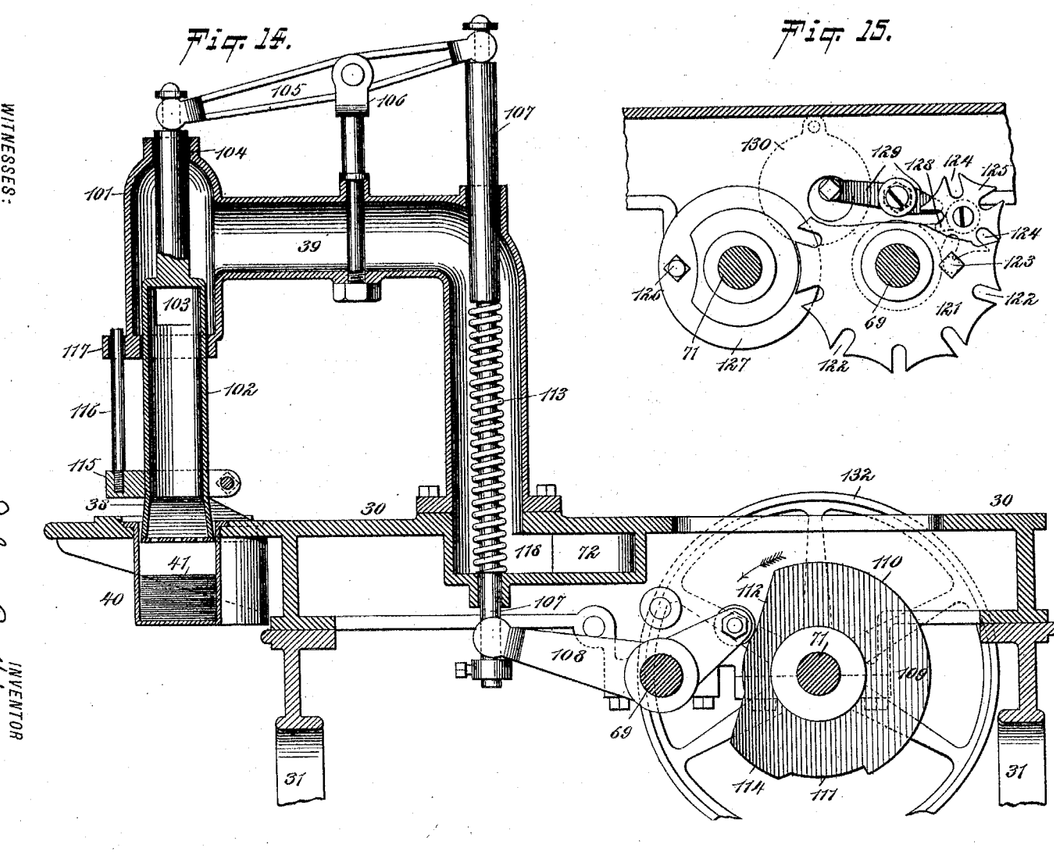
Fig. 14 is a like section on the same line of same, but illustrating the nozzle in its lower position, in which it releases the cut wrapper and permits the same to fall into a suitable box which receives the cut wrappers.
Fig. 15 is a longitudinal section through a portion of the frame of the machine and illustrating by full and dotted lines the bell mechanism by which an alarm is sounded when fifty wrappers have been cut and deposited in the box or receptacle shown in Fig. 14, the fifty cut wrappers constituting a book which upon being formed will be removed from the receiving-box.

The die 32 by a continuous movement passes from its position (shown in Fig. 1) to the left below the rollers 34 and then to its position (shown by dotted lines in Fig. 2) directly below the then elevated nozzle 38, and upon reaching this latter position the nozzle 38 is caused to descend upon the die to elevate the cut wrapper from the latter and thereafter the said nozzle 38 has a slight upward motion in order to permit the die 32 to freely return to its normal position (shown in Fig. 1) and then descends directly downward to the position in which it is illustrated in Fig. 14 to deposit the cut wrapper into the box or receptacle 40, which is provided to receive the cut wrappers, which in said Fig. 14 are indicated by the numeral 41. After the nozzle 38 deposits the wrapper within the receptacle 40 it returns to its upward position (shown more clearly in Fig. 13) preparatory to again having the die 32 pass below it.

Figure 1:
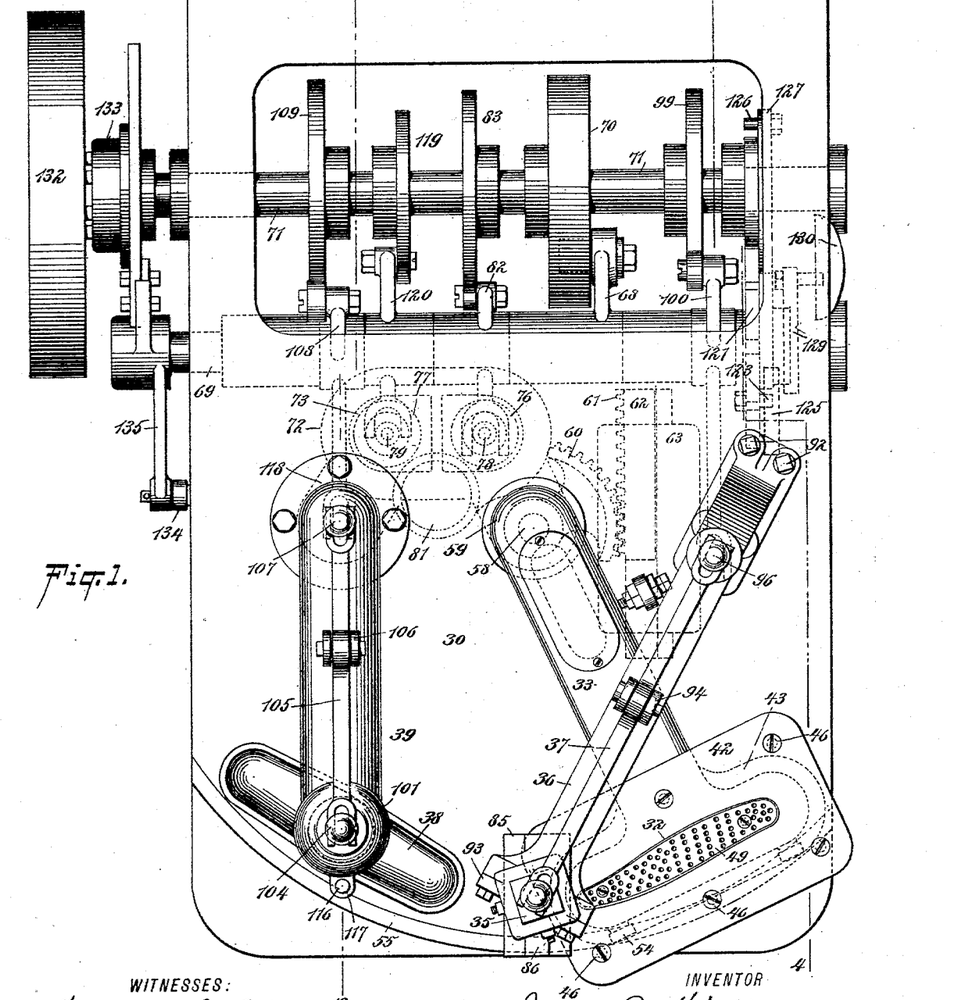
Figure 1 is a top view of a machine constructed in accordance with and embodying my invention, the parts being shown in their normal position with the die in position to receive the leaf preparatory to moving toward the left below the pressure-rollers and nozzle.
Figure 2:
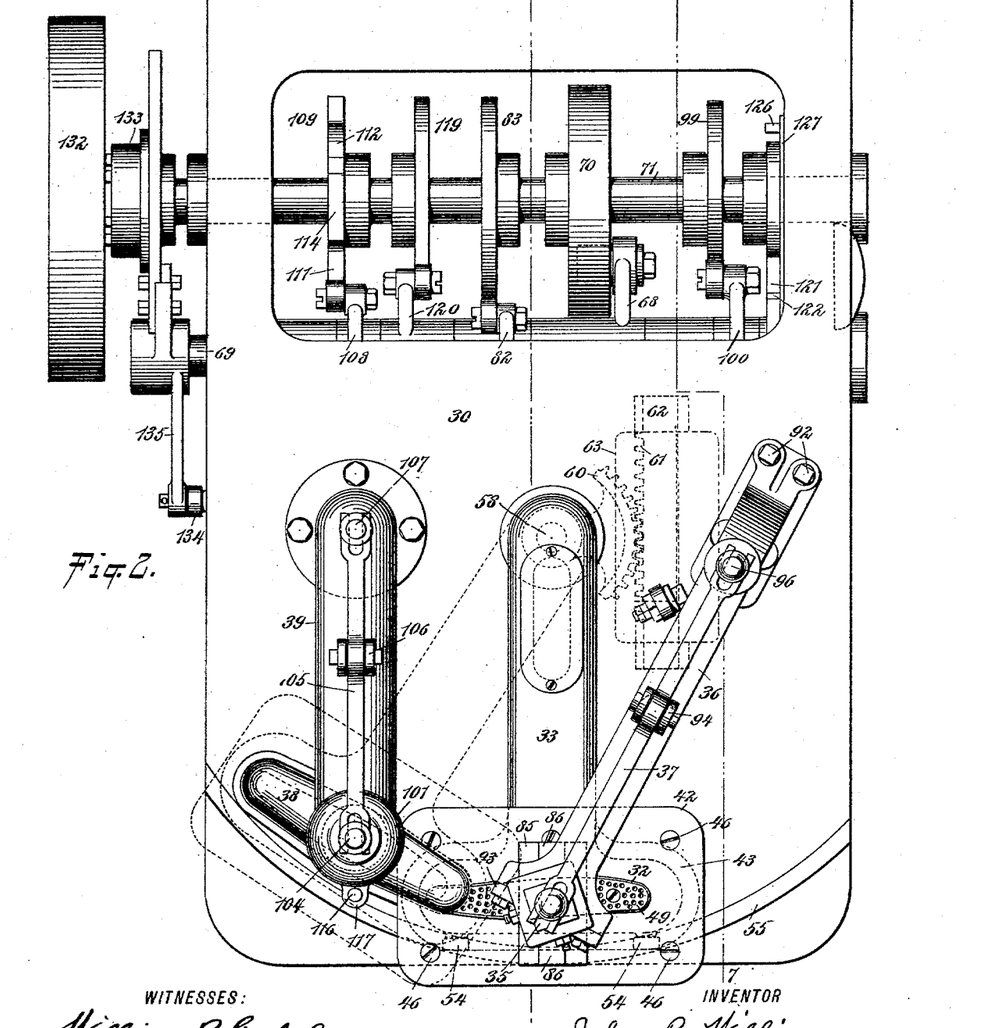
Fig. 2 is a like view of same, but illustrating by full lines the cutting-die on its passage below the pressure-rollers and by dotted lines its position below the nozzle by which the cut wrapper is removed therefrom.

The die 32 is connected with air-suction apparatus which holds the leaf thereon during the travel of the die from the position shown in Fig. 1 to its position indicated by dotted lines in Fig. 2, and the nozzle 38 is connected with air-suction apparatus, so that by means of air-suction said nozzle may elevate the cut wrapper from the die 32 and hold it suspended until the die 32 returns to its normal position. At the time when the nozzle 38 is to take the wrapper from the die 32 the air-suction is by suitable means, hereinafter described, cut off from said die and turned onto said nozzle. Thus the die is caused to readily release the wrapper and permit the nozzle to take the same.

The main elements located above the bed-plate of the machine having thus been preliminarily described and their general operation pointed out, each of said elements will be described in detail and the mechanism operating the same fully explained.

Figure 20:
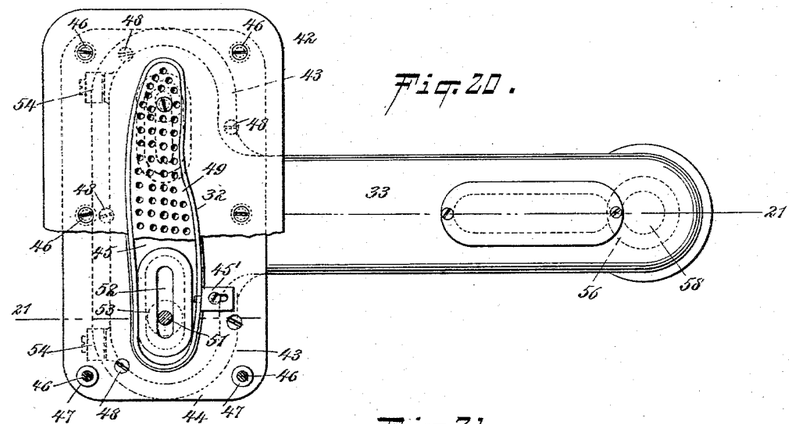
Fig. 20 is a top view, partly broken away, of the cutting-die, the table surrounding the same, and the oscillating arm by which said die and table are carried.

*The cutting-die and parts connected therewith.*—The cutting-die 32 will be in the outline of the wrapper to be cut and is surrounded by the table 42, the cutting edges of the die extending slightly above said table and the said die and its table 42 being secured to the front end of the hollow oscillating arm 33, which receives its motion from mechanism located below the main bed-plate 30. The form of the die 32 and its table 42 is clearly indicated in Figs. 1 and 2 and the details of the construction of said die 32, table 42, and oscillating arm 33 are more clearly indicated in Figs. 20 to 22, inclusive. The front end of the oscillating arm 33 is enlarged and elongated in outline, forming a head 43, as clearly indicated by the dotted lines in Figs. 1 and 20 and by full lines in Fig. 22.

Upon the head 43 of the oscillating arm 33 is secured the plate 44, upon which is secured the die 32, the latter being held in place by suitable lugs 45' in a well-known manner. The die 32 is hollow and is arranged above the opening 45 in the plate 44, and said die is, as above described, surrounded by its table 42, which by means of the screws 46, passing through sleeves 47, is secured to the plate 44, the latter being secured to the head 43 of the arm 33 by means of screws 48. Within the die 32 is provided a perforated or other suitable platen 49, the latter being yieldingly supported upon springs 50, encompassing the rods 51 in a manner known in this art. The rods 51 pass downward through elongated openings 52 in the base of the head 43 and are provided with heads 53, as more clearly illustrated in Fig. 22. When pressure is applied upon the platen 49, the rods will pass downward through the elongated openings 52 and the springs 50 will be compressed, and upon the pressure being relieved from the top of the platen 49 the springs 50 will restore said platen and the rods 51 to their former or normal position. (Illustrated in Fig. 22.)

The purpose of elongating the slots 52 in the base of the head 43 is to permit the adjusting of the rods 51 toward or from one another to meet the requirements of the different sizes of dies 32 and platens 49, which may be required for cutting the various sizes of wrappers required. The front edges of the head 43 of the arm 33 are provided with rollers 54, adapted to travel upon the tramway 55, formed on the table 30, during the movement of the oscillating arm 33 from the position in which it is shown in Fig. 1 to that in which it is illustrated by dotted lines in Fig. 2 and back to its normal position shown in Fig. 1.

Figures 10, 11, 12:
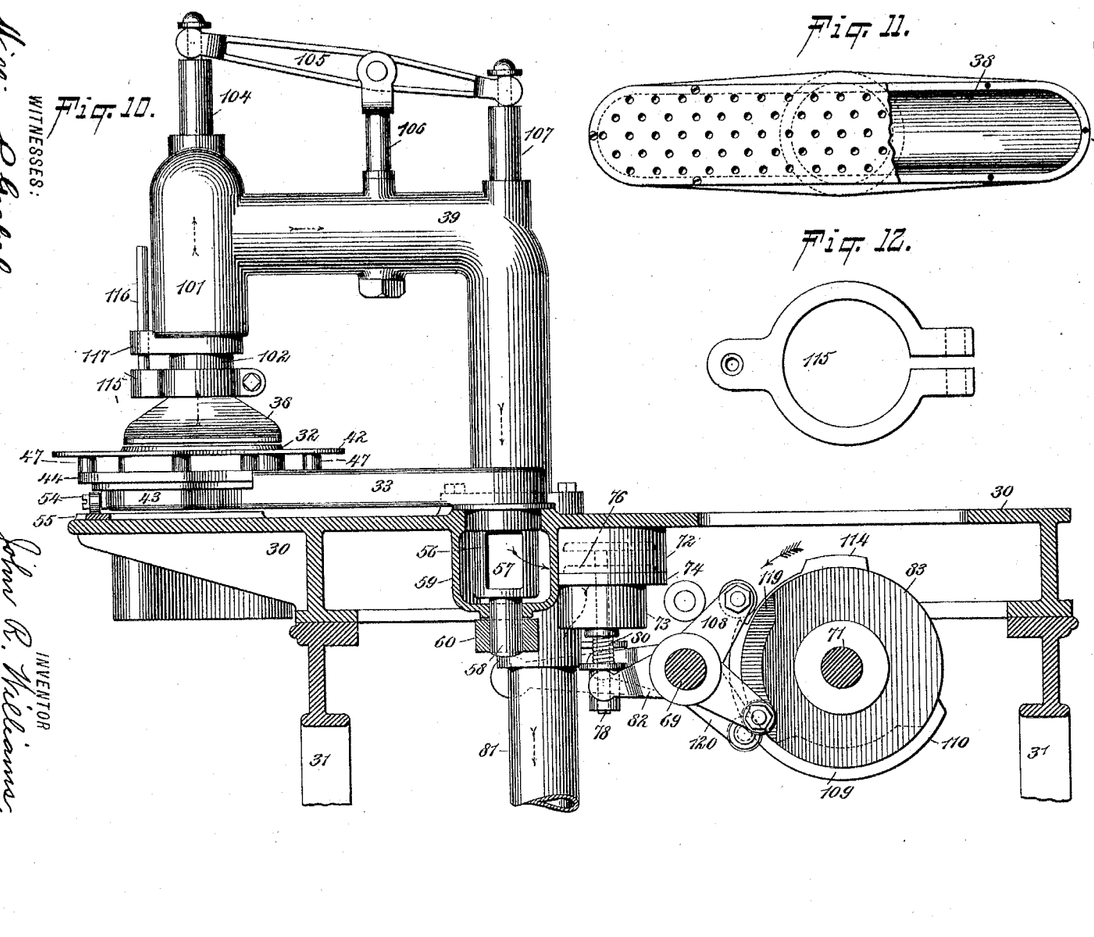
Fig. 10 is a vertical longitudinal section through the machine on the dotted line 10 10 of Fig. 2, but illustrating the cutting-die below the nozzle preparatory to having its wrapper taken by said nozzle.
Fig. 11 is a bottom view, partly broken away, of the nozzle which is utilized to remove the cut wrapper from the die.
Fig. 12 is a detached top view of a collar connected with the neck of said nozzle.
Figure 21:
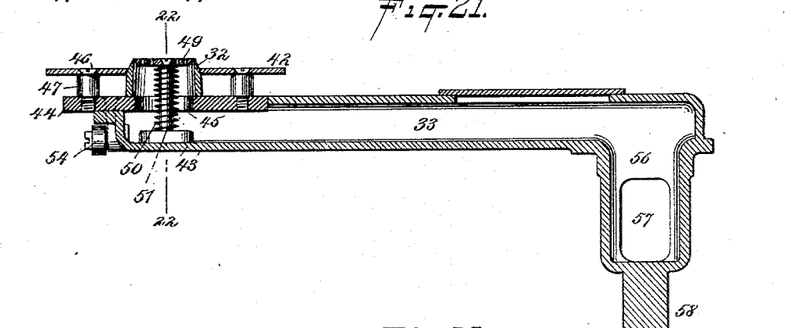
Fig. 21 is a vertical longitudinal section through same on the dotted line 21 21 of Fig. 20.
Figure 22:
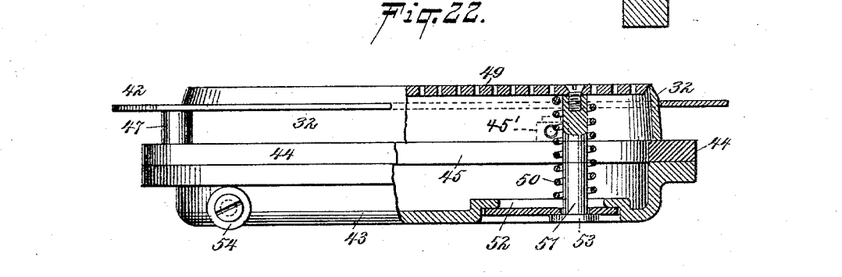
Fig. 22 is a front view, partly in section, of the said die, its surrounding table, and oscillating arm, the section being on the dotted line 22 22 of Fig. 21.

The head 43 on the arm 33 is hollow and is in communication with the hollow interior of the arm 33, as illustrated clearly in Fig. 21, and the inner end of said arm 33 has the downwardly-extending hollow portion 56, containing the opening 57 and provided below said opening with the pivot end 58, said portion 56 and the pivot end 58 extending downward through the bed-plate 30 of the machine and into a hollow chamber 59, below said bed, as illustrated in Fig. 10.

Upon the lower end of the pivot 58, connected with the arm 33, is secured the shank of the toothed segment 60, (shown by dotted lines in Figs. 1 and 2,) which segment is in constant engagement with the vertical teeth 61 of the sliding rack 62, which rack has a front and backward sliding movement and imparts through the segment 60 the proper oscillating motion to the arm 33 and die 32.

Figures 4, 5, 6:
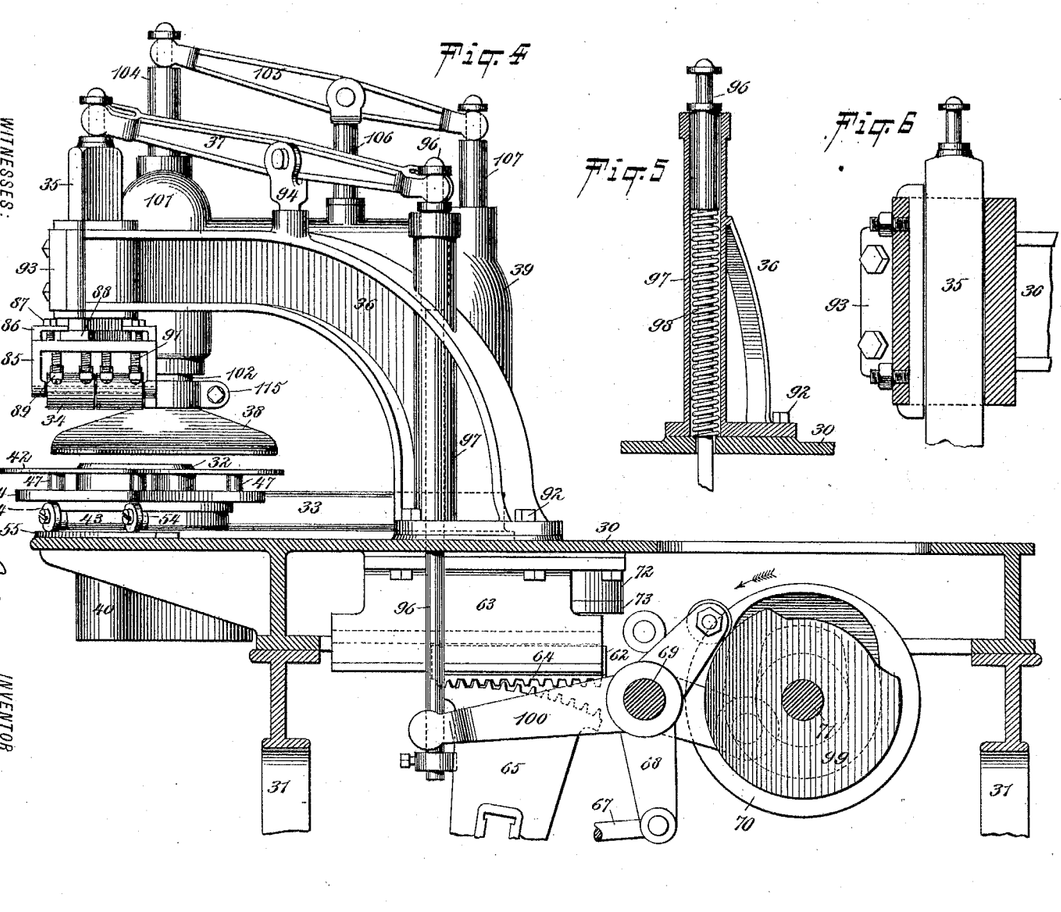
Fig. 4 is a side elevation, partly in section, of the machine with its parts in their normal or initial position, the section being on the dotted line 4 4 of Fig. 1.
Fig. 5 is a vertical section through a detached portion of the machine on the dotted line 5 5 of Fig. 3.
Fig. 6 is a detached vertical section through a portion of the frame surrounding the vertical rod which carries the pressure-rollers at its lower end.
Figures 7, 8, 9:
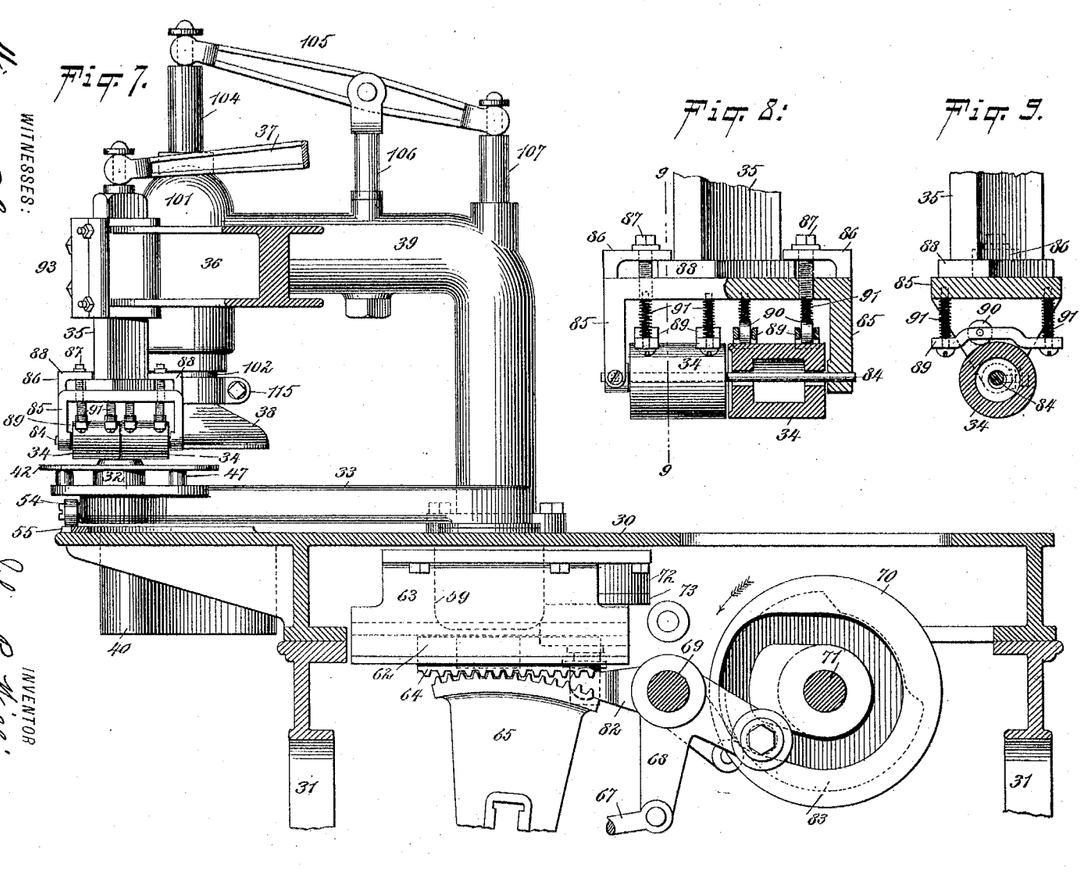
Fig. 7 is a vertical longitudinal section of the machine on the dotted line 7 7 of Fig. 2.
Fig. 8 is an enlarged detached elevation of the lower end of the rod supporting the pressure-rollers, one of the latter and a portion of the frame for said rollers being in vertical section.
Fig. 9 is a detached vertical section of same on the dotted line 9 9 of Fig. 8.
Figures 16, 17, 18:
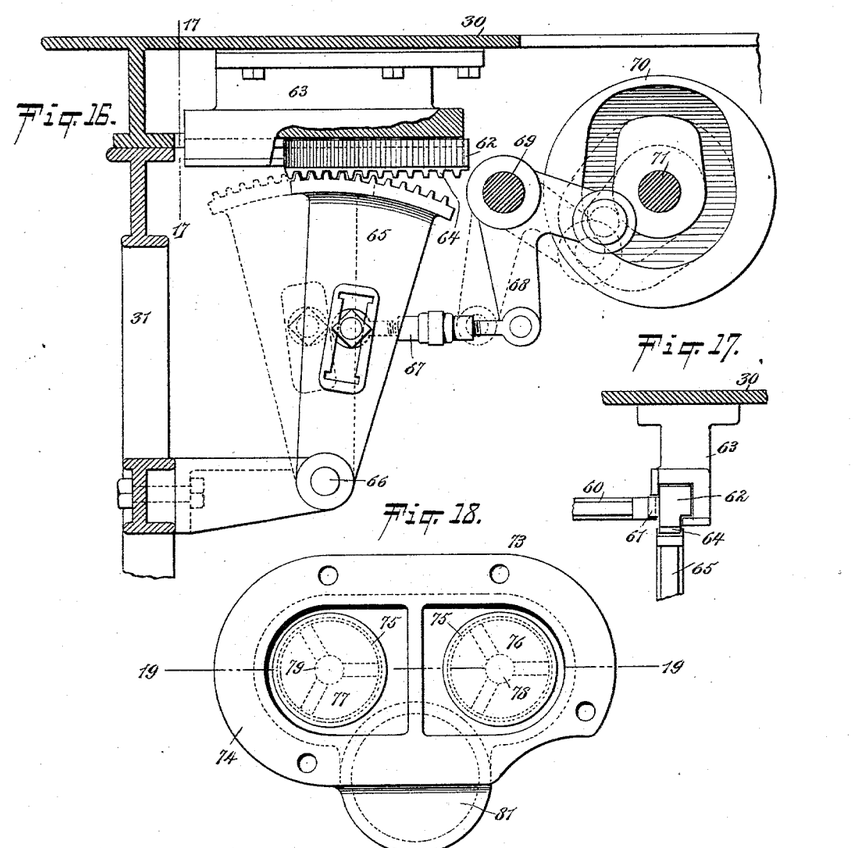

The sliding rack 62 is supported in the bracket 63, as shown by full lines in Figs. 4 and 7, and is provided upon its lower surface with the series of teeth 64, which are in engagement with the toothed segment 65, (more clearly shown in Fig. 16 by dotted and full lines,) said segment being mounted upon the stud 66 and connected by a rod 67 with the bell-crank lever 68, which is fulcrumed on the shaft 69 and has motion imparted to it from the cam 70, mounted upon the main driving-shaft 71. The two positions of the segment 65, bell-crank lever 68, and cam 70 are clearly illustrated by full and dotted lines, respectively, in Fig. 16.

During the revolving of the shaft 71 and cam 70 the bell-crank lever 68 will impart an oscillating movement to the segment 65, and this segment, being in engagement with the lower horizontal teeth 64 of the sliding rack 62, will impart a reciprocating or frontward and backward motion to the latter, and said slide 62, having its vertical or side teeth 61 in gear with the segment 60, will cause the latter to have a horizontal oscillating motion and impart the same to the arm 33 and die 32. Thus the oscillating motion of the arm 33 and die 32 from their normal position (shown in Fig. 1) to their final position, (indicated by dotted lines in Fig. 2,) and then back to their normal position, is effected from the main driving-shaft 71 through the cam 70, bell-crank lever 68, connecting-rod 67, segment 65, sliding rack 62, and segment 60, the latter being secured directly to the inner downwardly-extending pivot end 58 of said arm 33. The arm 33 and its head 43 are hollow and communicate with the hollow die 32 in order that air-suction may be effected through the same for holding the leaf upon the die preparatory to the cutting of the wrapper from the said leaf.

As above described, the hollow inner downwardly-extending portion 56 of the arm 33 passes downward within the chamber 59, which loosely encompasses said portion 56 of the arm 33, as illustrated in Fig. 10, and communicates at its rear side with the air-chamber 72, formed below the bed-plate 30 and receiving the air-box 73. (Shown in detail in Figs. 18 and 19). The air-box 73 has along its upper edge the flange 74, which is fastened to the lower edges of the air-chamber 72, the latter corresponding in outline with said air-box 73 and being cast directly with the bed-plate 30. The air-box 73 has formed in its top the valve-seats 75 75, adapted to receive the air-valves 76 and 77, which are connected to the valve-rods 78 and 79 and are normally held upon their seats by the springs 80, encompassing said rods 78 79. The valve 76 controls the passage of the air through the hollow arm 33 and die 32, and the valve 77 controls the passage of the air through the nozzle 38.

When the valve 76 is in its upward position, as indicated by the dotted lines in Fig. 10, the air-suction will be effected through the die 32, arm 33, air-chamber 59, air-chamber 72, and air-box 73 to the main suction-pipe 81, leading to the usual blower, and when the valve 76 is thus in its elevated position and the suction is created through the hollow arm 33 the leaf spread upon the die 32 will be securely held thereon by said suction during the travel of the die from the position shown in Fig. 1 to that in which it is illustrated by dotted lines in Fig. 2.

When the die 32 reaches the position in which it is illustrated by dotted lines in Fig. 2, the valve 76 will be closed, so as to cut off the suction from the arm 33, and at such time the valve 77 will open and permit suction to take place through the nozzle 38, thus enabling the latter to take the cut wrapper from the die 32 preparatory to the latter returning to its normal position (shown in Fig. 1) to receive another leaf.

The mechanism for operating the valve 76 is clearly illustrated in Fig. 10, in which it will be observed that the valve-rod 78 for said valve 76 is engaged by the lever 82, which is fulcrumed on the shaft 69 and is engaged by the cam 83, mounted upon the main driving-shaft 71. The rotation of the shaft 71 and cam 83 operates on the arm 82 to push the valve-rod 78 upward to open the valve 76 at the proper time, and when the suction is to be cut off from said hollow arm 33 and die 32 the form of the cam 83 is such that it permits the arm 82 to move farther inward toward the shaft 71 and the spring 80 to expand itself and pull the valve 76 to its closed position. Thus the cam 83 on the main driving-shaft 71 effects, through the arm 82, the opening of the valve 76 and permits, by means of the spring 80, the closing of said valve 76.

The valve 76 should always be open when the die 32 is to receive the wrapper and carry the same below the rollers 34 and to the nozzle 38, and upon reaching the latter point the valve 76 closes to cut off the suction from the arm 33 and die 32.

*The pressure-rollers and mechanism connected therewith.*—The pressure-rollers 34 press the leaf upon the die 32 to effect the cutting of the wrapper therefrom, and, as above described, the rollers 34 have no lateral motion, but simply, in addition to their revoluble motion, a vertical reciprocation from their upward position (shown in Fig. 4) to their lower position. (Shown in Fig. 7.) The details of the rollers 34 are probably most clearly illustrated in Figs. 4, 7, 8, and 9. The rollers 34 are mounted upon a horizontal shaft 84, passing loosely through said rollers and held at its ends in the rectangular frame 85, which, by means of clips 86 86 and screws 87, is supported from and secured to the head 88, formed at the lower end of the vertical rod 35, which carries said rollers and imparts to the same their vertical reciprocation. The clips 86 and screws 87, by which the frame 85 is connected with the head 88 of the rod 35, are removable, as clearly indicated in Fig. 8, and hence the frame 85, with its rollers 34, may be removed from the rod 35 whenever required either for their own adjustment or correction or to permit the substitution for them of other rollers to meet the requirements of the varying dies which may be carried by the arm 33.

Above the rollers 34 and below the top of the frame 85 are the transverse bars 89, carrying rollers 90 and pressed upon by the coiled springs 91, as shown in Figs. 8 and 9, the said rollers 90 having a bearing upon the rollers 34 and tending to press the same downward with a yielding pressure. The openings in the rollers 34, through which the shaft 84 passes, are greater than the diameter of the shaft 84, and hence the rollers 34 may have a restricted vertical motion, this being particularly provided in order that said rollers 34 may yield upward slightly against the pressure of the springs 91 while passing over the cutting edges of the die 32.

I provide two of the cross bars or arms 89 for each roller 34 and a spring at each end of each one of said cross bars or arms 89, and said springs are in exposed positions, so as to be readily gotten at and varied, if required, to suit the conditions of the leaf from which the wrappers are to be cut. The springs 91 are also so secured that they will not be disturbed upon the removal of the frame 85 from the vertical bar or rod 35, and their arrangement in connection with the cross-bars 89 is such that a very satisfactory pressure is exerted upon the rollers 34. The small rollers 90, carried by the cross-bars 89, are to prevent friction between said cross-bars and rollers 34, and in addition the middle portions of the cross-bars 89 extend upward, as shown more clearly in Fig. 9, so that the rollers 34 will not contact with any extended surface of said cross-bars. The rod 35, carrying the frame 85 and rollers 34, is mounted in the front outer end of the frame 36, which is rigidly secured at its inner end to the bed-plate 30 by means of screws 92.

The upper front end of the frame 36 is provided with a front plate 93, (see Figs. 1 and 2,) which permits of the insertion and removal of the rod 35, and upon the upper central portion of the frame 36 is secured the fork 94, within which is mounted the lever-beam 37, (see Fig. 4), whose front forked end engages the upper reduced end of the rod 35 and whose rear forked end engages the upper end of the rod 96, which passes downward through the sleeve 97, forming a part of said frame 36, and is encompassed within said sleeve by the coiled spring 98, as more clearly shown in Fig. 5. The rod 35, carrying the rollers 34, receives its vertical motion from the main driving-shaft 71 through the medium of the cam 99 and lever-arm 100, which is fulcrumed on the shaft 69 and engages at its front end the lower end of the rod 96. During the revolving motion of the shaft 71 and cam 99 the front end of the lever-arm 100 will be depressed and will pull the rod 96 downward, this having the effect of drawing the rod 35 and rollers 34 upward to their normal position. (Shown in Fig. 4.)

The rollers 34 and rod 35 remain in their upward position at all times except when the die 32 is passing directly below them, and at such time the rollers 34 will be moved to their lower position (shown in Fig. 7) in order to press the leaf upon the die 32 and effect the cutting of the wrapper therefrom. The form of the cam 99 is such that the rollers 34 will be held upward at all times except when the die 32 is passing directly below them, and at such time the depression in the cam 99 will permit the inward motion of the rear end of the lever-arm 100 and consequent elevation of the front end of said lever-arm, whereby the expansion of the spring 98 is permitted to move the rod 96 upward and the rod 35 and rollers 34 downward. As soon as the die 32 has passed to the left beyond the rollers 34 the cam 99 will immediately effect, through the lever 100, the downward motion of the rod 96 and the upward motion of the rollers 34, thus causing the latter to assume their normal position entirely clear of the die 32, the latter being thus permitted to return to its normal position (shown in Fig. 1) without having to pass in contact with the rollers 34. The rollers 34 are thus carried by the rod 35, and said rod is controlled as to its vertical reciprocation from the main driving-shaft 71 through the medium of the cam 99, lever-arm 100, vertical rod 96, spring 98, and beam-lever 37.

*The nozzle and the parts connected therewith.*—The nozzle 38 has a lower perforated face, as shown in Fig. 11, and in outline corresponds substantially with the outline of the die 32, from which it takes the cut wrappers preparatory to depositing the same in the box or receptacle 40. The nozzle 38 is supported within the front vertical end 101 of the hollow frame or arm 39, as clearly illustrated in Figs. 13 and 14. The neck 102 of the nozzle 38 extends upward within said vertical portion 101 of the frame 39 and has in its upper part the opening 103, which communicates with the hollow interior of the arm 39 and affords a passage for the air upward through the nozzle 38 to said arm 39. The upper end of the neck 102 of the nozzle 38 is furnished with the stem 104, which is engaged by the front forked end of the lever-beam 105, the latter being pivoted in the fork 106 and engaged at its rear forked end by the rod 107, which is adapted to have a vertical reciprocation and impart the same to the nozzle 38. The lower end of the rod 107 is engaged by the lever-arm 108, which is fulcrumed on the shaft 69 and has its rear end in engagement with the cam 109, secured upon the main driving-shaft 71, as more clearly shown in Figs. 13 and 14.

The form of the cam 109 controls the movement of the lever 108 and nozzle 38, and in the present instance the cam 109 is given the extended regular surface 110, the shallow depressed surface 111, and the extended depressed surface 112. While the extended regular surface 110 of the cam 109 is in contact with the lever 108 the front end of said lever will be maintained in its lower position and the nozzle 38 will be maintained in its upper or normal position, (shown in Fig. 7,) the spring 113 on the rod 107 being held compressed. When the depressed surface 111 of the cam 109 reaches the lever 108, the spring 113 will cause the rear end of said lever to quickly enter said depression, and thus the front end of the lever 108 will ascend and permit, under the action of the spring 113, the descent of the nozzle 38 upon the die 32, as illustrated in Fig. 10. As soon as the nozzle 38 descends upon the die 32 the air-valve 76 closes and the air-valve 77 opens, cutting off the air-suction from the die 32 and turning it on the nozzle 38, thus permitting the latter to take the cut wrapper from said die. The time required for the nozzle 38 to lift the cut wrapper from the die 32 is momentary, and hence the depression 111 in the cam 109 is of limited extent. As soon as the nozzle 38 has taken the cut wrapper from the die 32 the projection 114 on the cam 109 comes into contact with the lever-arm 108 and slightly elevates the nozzle 38 from the die 32 in order that the latter may return to the right to its normal position without scraping against the cut wrapper held by said nozzle, and thereafter the said projection 114 on the cam 109, having passed the lever 108, the more extended and greater depression 112 of said cam 109 will reach the lever 108 and permit the rearward movement of the rear end of the lever 108 and the upward movement of the front end of said lever, as shown in Fig. 14, whereby the spring 113 is enabled to press the rod 107 to its extreme upward position, and thereby, through the lever 105, cause the nozzle 38 to lower to its extreme lower position and enter the mouth of the box or receptacle 40, upon arriving at which position the air-valve 77 will close to cut off the air-suction from said nozzle and permit the cut wrappers to fall within the said box or receptacle for them, said wrappers detaching themselves from the nozzle and falling within the box 40 of their own weight.

The spring 113 keeps the lever-arm 108 constantly pressed against the cam 109, and thus the cam 109 is enabled to control the movement of the nozzle 38. After the wrapper has been released from the nozzle 38 the regular surface 110 of the cam 109 will again reach the lever-arm 108 and drive the rear end of said lever upward and frontward and depress the front end of said lever and the rod 107, thereby restoring the nozzle 38 to its normal upward position and again compressing the spring 113. The neck 102 of the nozzle 38 carries a collar 115, to which a guide-rod 116 is secured, and upon the lower end of the vertical portion 101 of the hollow arm 39 is provided the apertured lug 117, which receives said guide-rod 116 and coöperates with said rod in retaining the nozzle 38 in proper alinement with the die 32.

Figure 19:
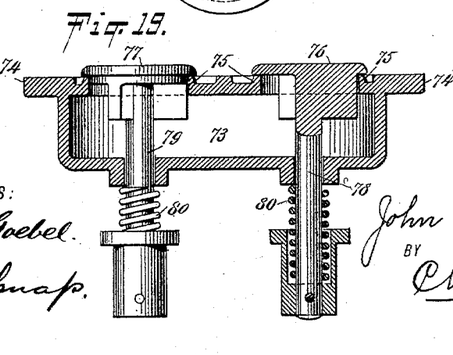
Fig. 19 is a vertical section of same on the dotted line 19 19 of Fig. 18.

It has been described hereinbefore that the air-suction for the nozzle 38 is controlled by the air-valve 77, and upon an inspection of Figs. 13 and 14 it will be seen that the inner vertical end of the arm or frame 39, supporting the nozzle 38, is screwed to the bed-plate 30 of the machine directly over an air-box 118, which is in the nature of a neck of the outline indicated by dotted lines in Fig. 1, and communicates with the air-chamber 72, hereinbefore described, and which is directly over and corresponds in outline with the air-box 73, supporting the said valve 77, as shown in Fig. 19. The air-valve 77 is held in its closed position by the spring 80 encompassing the valve-rod 79, and is adapted to be opened at the proper time by the cam 119 on the main driving-shaft 71 through the medium of the lever-arm 120, fulcrumed on the shaft 69. The lever-arm 120 corresponds in outline with the lever-arm 82 for operating the air-valve 76, and the cam 119 is in line with the cam 83, by which said arm 82 is actuated. The cam 119 operates at the proper time to elevate the valve-rod 79, carrying the valve 77, and the spring 80 keeps the lever-arm 120 against the cam 119 and restores the the valve 77 to its closed position as soon as the inner rear end of the arm 120 reaches the depression in said cam 119. The form of the cam 119 will be such as to secure the opening of the valve 77 to create the air-suction through the nozzle 38 at the time when said nozzle is to lower upon the die 32 for the purpose of lifting the cut wrapper therefrom, and said valve 77 will remain open until the nozzle 38, holding the cut wrapper, descends to its lower position (shown in Fig. 14) and is ready to release the wrapper, whereupon the valve 77 will close, cutting off the air-suction from the nozzle 38 and permitting the wrapper to fall from said nozzle and be caught in the box or receptacle 40.

The box or receptacle 40 is simply a tin box of suitable size dropped through an opening in the bed-plate 30 and having a horizontal flange along its upper edge by which it may rest upon the edges of said bed-plate surrounding said opening. The box or receptacle 40 is removable from the bed-plate, so as to render it convenient to turn the wrappers 41 therefrom.

It is customary to form the wrappers 41 into books of fifty wrappers each, and hence it is desirable that some warning be given to the operator every time fifty wrappers have been deposited within the box or receptacle 40, and to this end I provide the machine hereinbefore described with a gong which will sound every time fifty wrappers have been cut and deposited within the said box or receptacle 40. This gong and the mechanism operating the same are illustrated in Fig. 15, in which it will be seen that upon the shaft 69 is provided the disk or wheel 121, having the series of notches 122 and carrying a pin 123 to engage the notches 124 in the smaller disk or wheel 125. The disk or wheel 121 has ten notches 122 and the disk or wheel 125 has five notches 124. The disk or wheel 121 is engaged by the pin 126, carried by the wheel 127, which is mounted on the main driving-shaft 71. With each revolution of the shaft 71 and wheel 127 the said pin 126 engages a recess or notch 122 in the wheel 121 and turns the latter a distance equal to the space between two of its notches 122. With each revolution of the shaft 71 one wrapper is cut and deposited in the box 40 and the wheel 121 is turned one space, and hence with every ten revolutions of the shaft 71 and wheel 127 the wheel 121 will form one complete revolution. With each revolution of the wheel 121 the pin 123, carried thereby, will turn the wheel or disk 125 a distance equal to the space between two of its notches or recesses 124, and hence with every five revolutions of the disk or wheel 121 the disk or wheel 125 will form one complete revolution, this revolution being completed at the end of every fifty revolutions of the driving-shaft 71. Upon the completion of each revolution of the disk or wheel 125 a tooth 128, formed thereon, will strike the bell-hammer lever 129 and cause the latter to sound the gong 130, this sounding of the gong indicating to the operator that the driving-shaft 71 has made fifty complete revolutions and that fifty wrappers have been cut and deposited within the box 40. The invention is not limited to the bell mechanism illustrated in Figs. 15 and 1, but said mechanism will be found to be entirely reliable and satisfactory.

The operation of the machine hereinbefore described will probably be understood from the description hereinbefore given, and only a further brief reference to the operation will be necessary.

Figure 3:
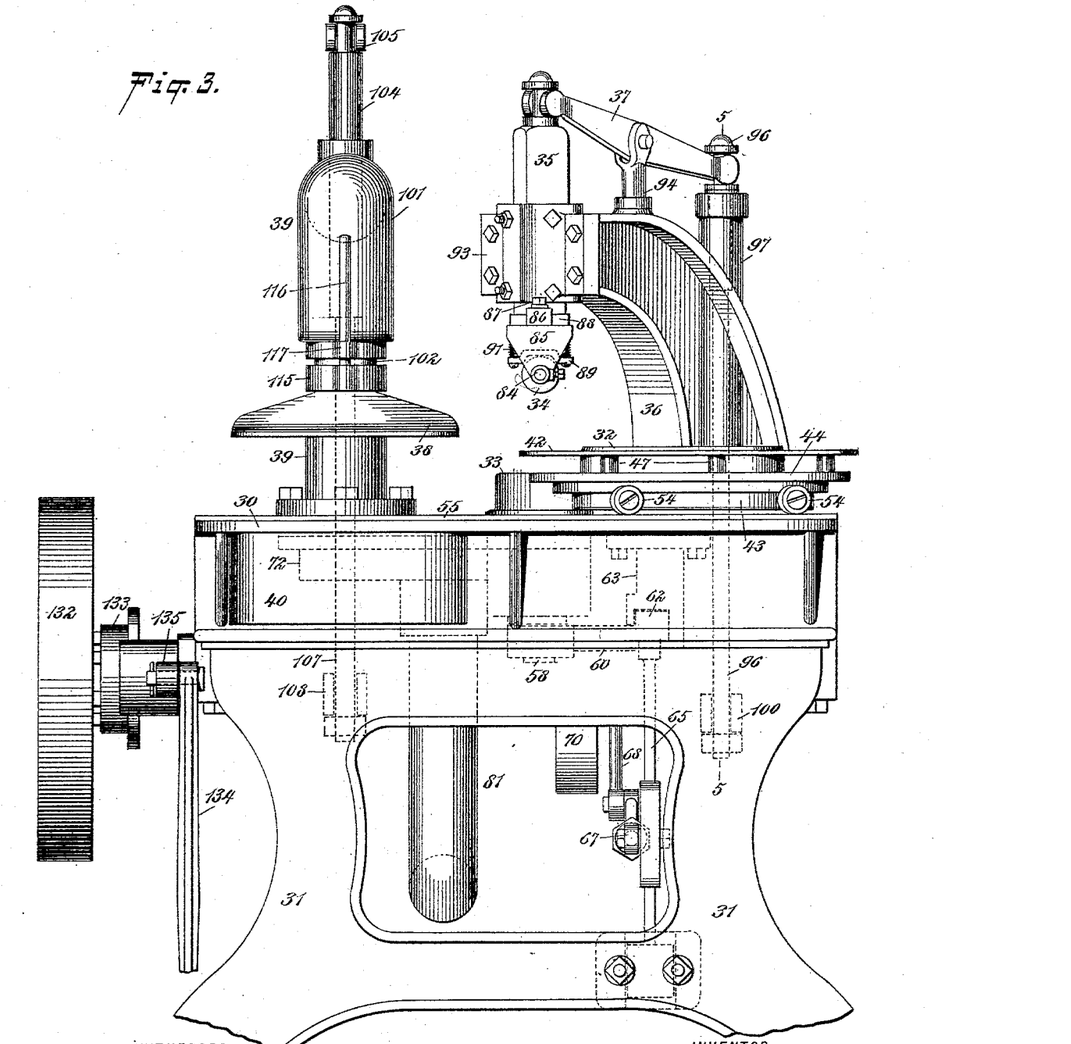
Fig. 3 is a front elevation, partly broken away, of the machine, the parts of the latter being shown in their normal position, illustrated in Fig. 1.

The normal initial condition of the machine is illustrated in Fig. 1, and the parts being in the position indicated in Fig. 1 the leaf will be spread upon the die 32 and its surrounding table 42, the air-suction being turned on to said die 32 by means of the cam 83, operating through the lever 82 to open the air-valve 76. The air-suction will hold the wrapper smoothly over the die 32, and the latter will promptly be moved toward the left by the oscillating action of the hollow arm 33, the die passing below the rollers 34 and then directly below the nozzle 38. Upon the approach of the die 32 toward the rollers 34 the latter will descend and effect the pressing of the leaf upon the edges of the die 32 to insure the cutting of the wrapper from said leaf. As soon as the die 32 has passed below the nozzle 38 the latter will descend, the valve 77 open, and the valve 76 close, thus cutting off the air from the die 32 and turn into the nozzle 38 and permitting the latter to take the cut wrapper from the die 32. The nozzle 38 will thereupon immediately ascend for a short distance only and the die 32, with its arm 33, will return to its normal position (shown in Fig. 1) and the nozzle will thereupon immediately descend and deliver the cut wrapper to the box or receptacle 40, the valve 77 closing to permit the cut wrapper to fall from the nozzle 38, and the valve 76 opening to restore the air-suction in the arm 33 and die 32, in order that the latter may be immediately supplied with another leaf from which a wrapper may be cut. This operation is continued until fifty wrappers have been deposited in the box 40 and the gong 130 has been sounded, whereupon the operator will either remove the box 40 from the machine to empty it, or remove the wrappers from the box in order that another book of fifty wrappers may be at once formed. The air-valve 76, controlling the suction through the arm 33 and die 32, is actuated from the main driving-shaft 71 through the cam 83, as shown in Fig. 10. The oscillating arm 33 and die 32 receive their oscillating motion from the main driving-shaft 71 through the cam 70, lever-arm 68, connecting-rod 67, segment 65, horizontal sliding rack 62, and segment 60, the latter being secured to the lower pivot end or stem 58 of said arm 33, as clearly shown in Figs. 1, 2, 16, and 17. The rollers 34 have their vertical reciprocation imparted to them from the main driving-shaft 71 through the cam 99, lever-arm 100, rod 96, pivoted lever 37, and plunger-rod 35, as illustrated in Figs. 4 and 5, and, as above described, the rollers 34 are in line with the path of the die 32 and are moved downward to press the leaf upon the die 32 while the latter is traveling toward the left of the nozzle 38, and thereupon the said rollers are elevated so as not to contact with the edges of the die 32 upon the return of the latter to its normal position. (Shown in Fig. 1.) The nozzle 38 receives its vertical motion, as specifically pointed out hereinbefore, from the main driving-shaft 71, through the cam 109 thereon, the lever-arm 108, rod 107, and lever-beam 105, as more clearly shown in Fig. 14, and the air-valve 77 for said nozzle 38 is operated from the main driving-shaft 71 through the cam 119 and lever-arm 120. Thus all of the parts of the machine are actuated from the one driving-shaft 71, and this driving-shaft receives its motion from the belt-wheel 132. The driving-shaft 71 will be provided with any suitable form of automatic clutch 133, adapted to automatically cut off the power of said wheel 132 from the shaft 71 at the conclusion of each revolution of the latter. Thus at the end of each revolution of the driving-shaft 71 the machine will come to a rest in order to enable the operator to place the leaf upon the die 32 and table 42. The clutch 133 will be released by the operator by the pressure of her foot upon a suitable treadle connected with the rod 134, the latter being pivotally connected with the clutch-arm 135, as shown in Fig. 3. Thus each time the operator has placed the leaf upon the die 32 she will press with her foot upon the treadle in the usual manner and release the clutch mechanism 133 and immediately remove her foot from said treadle. Thus with each revolution of the driving-shaft 71 the clutch mechanism will automatically cut off the power of the belt-wheel 132 from the shaft 71 and the machine will come to a stop, and upon the placing of the leaf upon the die 32 the operator, by releasing the clutch mechanism, will set the machine in motion to perform its duty during another revolution of the driving-shaft 71. With each revolution of the driving-shaft 71 the die 32 passes from its position shown in Fig. 1 to its position illustrated by dotted lines in Fig. 2 and back to its position shown in Fig. 1, and the cut wrapper is taken by the nozzle 38 and deposited within the box or receptacle 40. The clutch mechanism 133 is of well-known form and construction in this art and is not claimed herein.

This application is not limited to details of form, arrangement, or construction, nor is the invention limited to the two rollers 34 34, since in this art the use of either one long roller or two shorter rollers to effect the cutting of the wrapper is well known.

Cross-reference is hereby made to my pending application for Letters Patent for improvements in cigarette-making machines, Serial No. 605,280, filed September 9, 1896, in which, in other forms and combinations, some of the prominent features of this application are shown and claimed.

What I claim as my invention, and desire to secure by Letters Patent, is—

1. In a machine of the character described, the cutting-die, air-suction apparatus connected therewith, and means for moving said die from the position in which it receives the leaf to the position in which it surrenders the wrapper, combined with means in the path of said die for pressing the leaf thereon to effect the cutting of the wrapper, the nozzle adapted to remove the cut wrapper from said die, suction apparatus connected with said nozzle, and means for imparting a reciprocating movement to said nozzle; substantially as set forth.

2. In a machine of the character described, the cutting-die, air-suction apparatus connected therewith, and means for moving said die from the position in which it receives the leaf to the position in which it surrenders the wrapper, combined with means in the path of said die for pressing the leaf thereon to effect the cutting of the wrapper, mechanism for imparting a vertical reciprocation to said pressing means, the nozzle adapted to remove the cut wrapper from said die, suction apparatus connected with said nozzle and means for imparting a reciprocating movement to said nozzle; substantially as set forth.

3. In a machine of the character described, the cutting-die, air-suction apparatus connected therewith, and means for moving said die from the position in which it receives the leaf to the position in which it surrenders the wrapper, combined with means in the path of said die for pressing the leaf thereon to effect the cutting of the wrapper, the nozzle adapted to remove the cut wrapper from said die, suction apparatus connected with said nozzle and means for imparting first a downward motion to said nozzle to take the wrapper from the die, then an upward movement to said nozzle to permit the escape of the die, and then a downward movement of said nozzle to permit the delivery of the wrapper to the receiver for the wrapper; substantially as set forth.

4. In a machine of the character described, the cutting-die, and means for holding the leaf thereon, combined with the rollers in line with said die for pressing the leaf thereon to effect the cutting of the wrapper, means for lowering said rollers to effect the cutting of the wrapper and then elevating them above the horizontal plane of the travel of the die, and the nozzle connected with air-suction for removing the cut wrapper from the die; substantially as set forth.

5. In a machine of the character described, the hollow arm 33 connected with air-suction apparatus, the die carried by said arm for cutting the wrapper, and means in the path of said die for pressing the leaf thereon, combined with the segment 60 secured to the inner end of said arm 33, the sliding rack 62 having teeth upon one side in engagement with said segment 60, the pivoted segment 65 having its teeth in engagement with the teeth at the lower side of said rack 62, the lever 68 having one arm connected with said segment 65 and the cam 70 upon the driving-shaft and engaging the other arm of said lever 68 for oscillating the same and thereby imparting motion through said segments and sliding rack to said oscillating arm 33; substantially as set forth.

6. In a machine of the character described, the cutting-die, air-suction apparatus connected therewith, and means for moving said die from the position in which it receives the leaf to the position in which it surrenders the wrapper, combined with means in the path of said die for pressing the leaf thereon to effect the cutting of the wrapper, the hollow arm or frame 39 connected with air-suction apparatus, the nozzle 38 adapted to have a vertical reciprocation in the end of said frame 39 to take the wrapper from the die and deliver the same, the collar 115 on said nozzle, the guide 116 carried by said collar and entering a guide-lug 117 on said hollow arm or frame 39, and means for reciprocating said nozzle from the main driving-shaft of the machine; substantially as and for the purposes set forth.

Signed at New York, in the county of New York and State of New York, this 29th day of May, A. D. 1897.

JOHN R. WILLIAMS.

Witnesses:
 CHAS. C. GILL,
 E. JOS. BELKNAP.